United States Patent
Kashibuchi

(10) Patent No.: US 8,755,064 B2
(45) Date of Patent: Jun. 17, 2014

(54) INFORMATION PROCESSING APPARATUS, INFORMATION PROCESSING METHOD, AND INFORMATION PROCESSING PROGRAM PROTECTING SECURITY OF AN OBJECT IN A DOCUMENT

(75) Inventor: Yoichi Kashibuchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 1055 days.

(21) Appl. No.: 12/207,705

(22) Filed: Sep. 10, 2008

(65) Prior Publication Data

US 2009/0083316 A1  Mar. 26, 2009

(30) Foreign Application Priority Data

Sep. 21, 2007 (JP) ................. 2007-246091

(51) Int. Cl.
*G06K 15/00* (2006.01)

(52) U.S. Cl.
USPC .............. 358/1.14; 358/1.1; 707/999.103; 707/E17.009

(58) Field of Classification Search
USPC ............ 358/1.14, 1.1; 707/999.103, E17.009
See application file for complete search history.

(56) References Cited

U.S. PATENT DOCUMENTS

| 6,429,948 | B1 | 8/2002 | Rumph | |
|---|---|---|---|---|
| 2001/0036316 | A1 | 11/2001 | Kunimasa | |
| 2003/0164973 | A1 | 9/2003 | Hisatomi | |
| 2004/0091177 | A1* | 5/2004 | Eaton | ............ 382/311 |
| 2005/0111053 | A1 | 5/2005 | Yoshida | |
| 2005/0134896 | A1* | 6/2005 | Koga | ............ 358/1.14 |
| 2005/0259297 | A1 | 11/2005 | Tanaka | |
| 2006/0082794 | A1* | 4/2006 | Simske et al. | ........ 358/1.2 |
| 2006/0290967 | A1 | 12/2006 | Sumitomo | |
| 2007/0097448 | A1 | 5/2007 | Iizuka | |

FOREIGN PATENT DOCUMENTS

| EP | 1492338 A1 | 12/2004 |
|---|---|---|
| JP | 2005-159517 A | 6/2005 |
| JP | 2005-340956 A | 12/2005 |
| JP | 2006-252231 A | 9/2006 |

OTHER PUBLICATIONS

Nakagawa et al., Secure System, Nov. 10, 1995, JP 07295892 A.*

* cited by examiner

*Primary Examiner* — Benny Q Tieu
*Assistant Examiner* — Martin Mushambo
(74) *Attorney, Agent, or Firm* — Canon U.S.A., Inc. IP Division

(57) ABSTRACT

An information processing apparatus includes a generation unit configured, in extracting an object from an input document, to generate object data including a word indicating a characteristic of the object and store the generated word in a storage area, a storage unit configured to store a table holding the word indicating a characteristic of the object associated with a degradation level, and a degradation unit configured, in performing output processing by reusing the object, to determine whether the word indicating a characteristic of the object to be reused is associated with the degradation level, and if it is determined that the word indicating the characteristic of the object is associated with the degradation level, to degrade the object according to the degradation level corresponding to the word indicating the characteristic of the object.

6 Claims, 17 Drawing Sheets

FIG.9

| SECURITY LEVEL | WORD INDICATING CHARACTERISTIC OF OBJECT |
|---|---|
| LEVEL 1 | SCENIC SHOT |
| LEVEL 2 | C COMPANY |
| LEVEL 3 | NEXT-GENERATION MFP NEXT-GENERATION SFP FOR INTERNAL USE ONLY |

FIG.11

| ATTRIBUTE | SECURITY LEVEL | | |
|---|---|---|---|
| | LEVEL 1 | LEVEL 2 | LEVEL 3 |
| IMAGE | RESOLUTION DEGRADATION | RESOLUTION DEGRADATION | DELETE |
| GRAPHIC | CONVERSION INTO BITMAP | RESOLUTION DEGRADATION | DELETE |
| TEXT | CONVERSION INTO BITMAP | DELETE ONLY WORD INDICATING CHARACTERISTIC OF OBJECT | DELETE WHOLE TEXT |

FIG.15

| DOCUMENT ATTRIBUTE / USER INFORMATION | IMAGE | GRAPHIC | TEXT |
|---|---|---|---|
| GUEST | —/— | —/— | —/— |
| USER A | LEVEL 2/ RESOLUTION DEGRADATION | LEVEL 2/ RESOLUTION DEGRADATION | LEVEL 2/ COMPLETE RESTORATION |
| USER B | LEVEL 3/ COMPLETE RESTORATION | LEVEL 3/ COMPLETE RESTORATION | LEVEL 3/ COMPLETE RESTORATION |

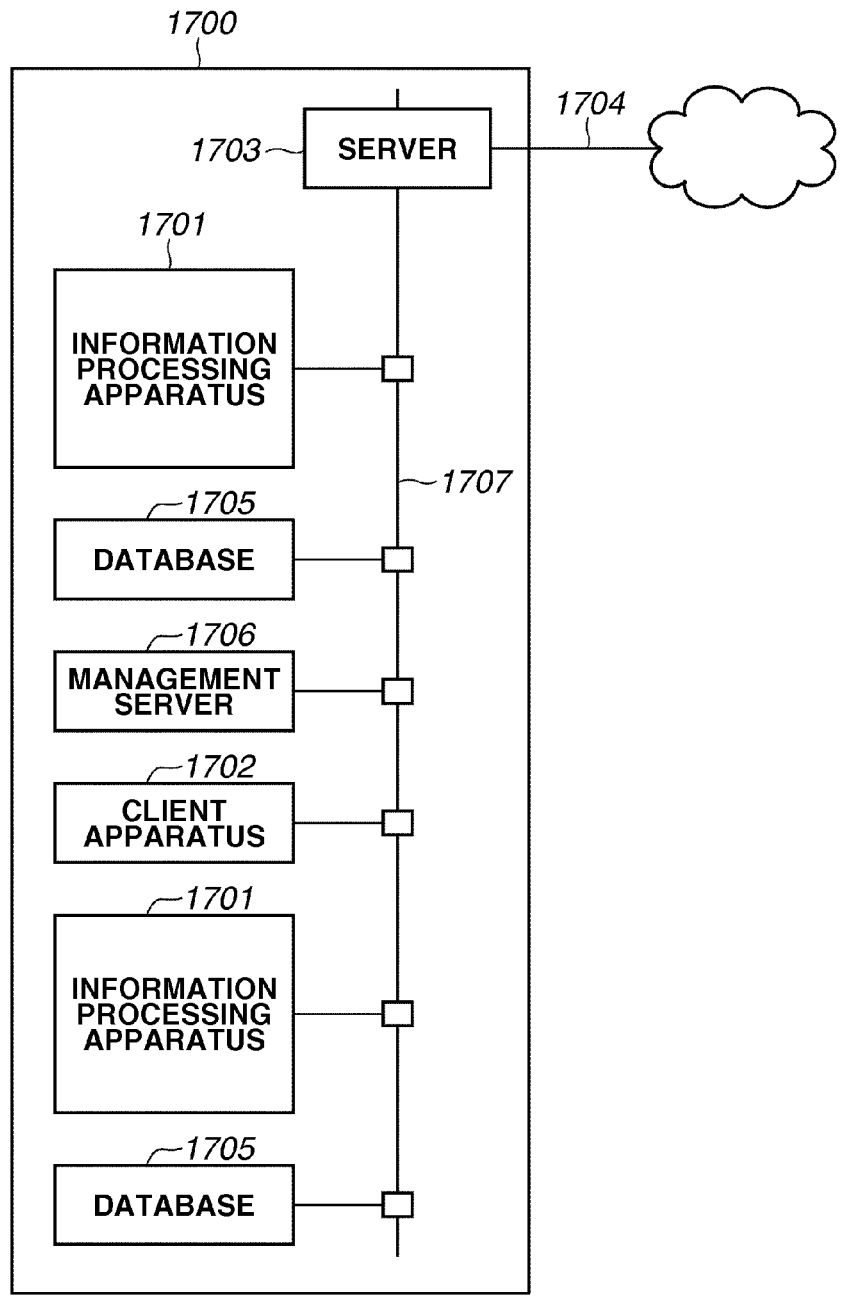

INFORMATION PROCESSING APPARATUS, INFORMATION PROCESSING METHOD, AND INFORMATION PROCESSING PROGRAM PROTECTING SECURITY OF AN OBJECT IN A DOCUMENT

BACKGROUND OF THE INVENTION

1. Field of the Invention

The present invention relates to an information processing apparatus capable of protecting the security of an object included in a document.

2. Description of the Related Art

In recent years, a conventional image processing apparatus such as a copying machine digitally performs image processing with various functions, which have been developed in response to the desire of the market. For example, a recent conventional copying machine includes a COPY function for copying an original (document), a page description language (PDL) function for printing a document generated by a host computer, and a SEND function for sending a document to an external apparatus via a network.

In addition, a conventional image processing apparatus includes multiple functions such as a COPY function, a BOX function for internally storing the image data of the document generated using the PDL function and reusing the stored image data, an editing function such as a combining function and a bookbinding function performed by utilizing the document image stored in the apparatus using the BOX function.

Meanwhile, along with the above-described various functions, users have desired a high image quality. Thus, the resolution of an image processing apparatus has increased from a relatively low level of about 600 dots per inch (dpi) to 1,200 dpi, and further to 2,400 dpi.

Similarly, the number of bits of a signal has increased from 8 bits, then to 10 bits, and further to 12 bits.

However, as a result of this development, it becomes necessary to add to the apparatus a memory and a storage device for storing bit-mapped data for image processing having a large amount of information or replace a central processing unit (CPU) of the apparatus with a new one having a higher performance. Accordingly, costs of development and manufacture of the apparatus or running costs may increase.

Consequently, various methods have been introduced to solve the above-described problem. For example, Japanese Patent Application Laid-Open No. 2005-159517 discusses an image processing apparatus capable of efficiently and readily editing an image of a read document with a simple configuration.

Furthermore, Japanese Patent Application Laid-Open No. 2005-159517 discusses a method for converting an object including a text attribute or a graphic attribute into vector data. Furthermore, the method discussed in Japanese Patent Application Laid-Open No. 2005-159517 converts an object having an image attribute into a Joint Photographic Experts Group (JPEG) file and uses the JPEG file in processing for the editing function and the SEND function.

In the processing using the editing function, vector data is used. Vector data can be easily edited or deformed without processing bit-mapped data including a large amount of information and having a high resolution and a large number of bits. Accordingly, costs for the apparatus can be reduced and the operability can be improved.

Furthermore, in the case of using the SEND function, vector data can be sent outside after being converted into a general format such as scalable vector graphics (SVG). Thus, data independent from the resolution can be sent in a state in which the data can be easily reused.

With the above-described method, the quality of the image output by an image processing apparatus and the user's convenience can be improved.

Furthermore, leakage or unauthorized disclosure of information in sending a document or data to an external apparatus can be prevented by previously deleting an area of the document that has been arbitrarily designated by a user at the time of editing.

Furthermore, when the deleted document is to be restored, if information about the document before a specific area has been deleted, is yet stored in the apparatus, pointer information indicating a storage location of the document is coded as two-dimensional bar codes and embedded on the document. Thus, in rereading the externally sent document, the pointer information is decoded and information about the original document can be obtained.

However, in the case of a document including confidential information, personal information, or an object whose utilization is to be restricted, it is necessary for a user to manually designate each concerned object.

Therefore, even if utilization of a document is to be restricted, its security depends on whether the user recognizes that the utilization of the document is to be restricted. As a consequence, leakage of information or unauthorized use of a restricted document may not be always prevented if the user does not have a high awareness of security.

Furthermore, even if an object can be externally sent while the document including the object cannot be easily reused and does not need to be deleted, the deletion of the object is the only way to restrict the utilization in this case.

Furthermore, in the case where a specific area of the document has been deleted and pointer information indicating a storage location of the original document is encoded and sent in two-dimensional bar codes as visible information, since the pointer information is visually combined, the desired document may not be accessed if the document has been degraded or the accuracy of combination of the pointer information is low.

Furthermore, a user who receives the visible pointer information can recognize that the received document includes confidential information whose utilization is restricted just by looking at the document.

SUMMARY OF THE INVENTION

The present invention is directed to an information processing apparatus capable of protecting a security of an object included in a document without requiring a user to perform an operation.

According to an aspect of the present invention, an information processing apparatus includes a generation unit configured to generate, in a case that an object is extracted from an input document, object data including a word indicating a characteristic of the object and store the generated word in a storage area, a storage unit configured to store a table holding the word indicating a characteristic of the object associated with a degradation level, and a degradation unit configured to determine, in a case that the information processing apparatus performs output processing using the object, whether the word indicating a characteristic of the object is associated with the degradation level, and if it is determined that the word indicating the characteristic of the object is associated with the degradation level, to degrade the object according to the degradation level corresponding to the word indicating the characteristic of the object.

According to another aspect of the present invention, a security of an object included in a document can be protected without requiring a user operation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 9 illustrates an example of a table storing a word indicating a characteristic of an object and a security level associated with each other according to an exemplary embodiment of the present invention.

FIG. 11 illustrates an example of a degradation level corresponding to a characteristic of an object and the security level according to an exemplary embodiment of the present invention.

FIG. 15 illustrates an example of a restoration level corresponding to user information and a characteristic of an object according to an exemplary embodiment of the present invention.

FIG. 17 illustrates an example of a configuration of another system including the image processing apparatus according to an exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
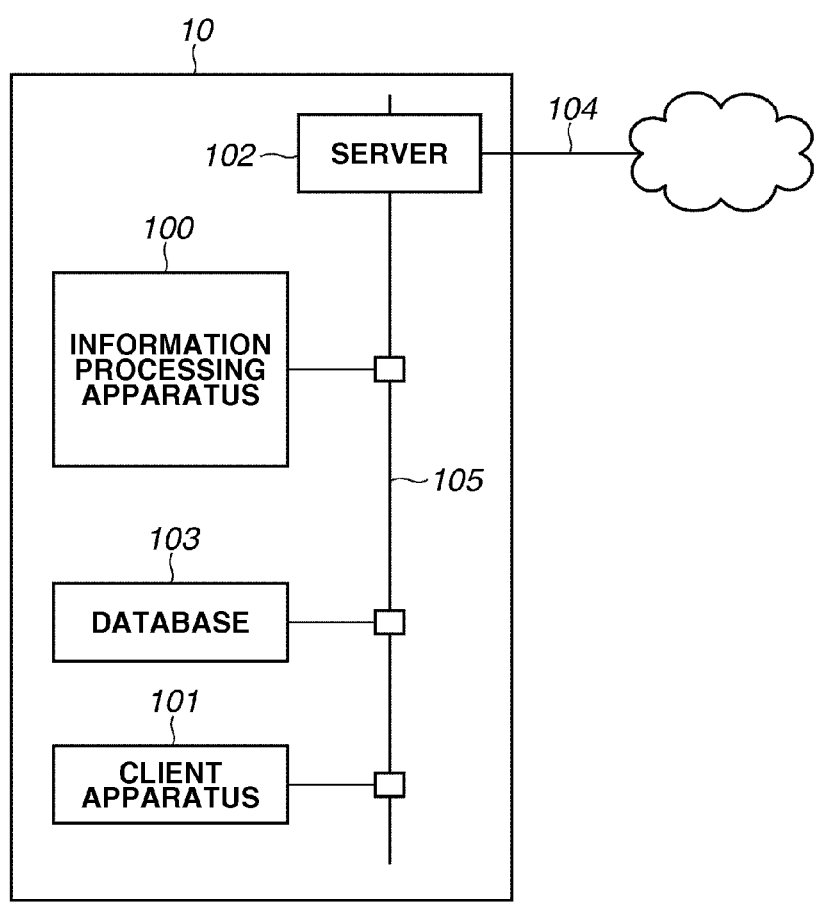
FIG. 1 illustrates an example of a configuration of a system including an image processing apparatus according to an exemplary embodiment of the present invention.

FIG. 1 illustrates an example of a configuration of a system including an image processing apparatus (information processing apparatus) according to an exemplary embodiment of the present invention.

Referring to FIG. 1, the system includes an image processing apparatus 100, a client apparatus 101, a server 102, a database 103, a network 104, and a network 105. Here, for example, the network 105 is a local area network (LAN) installed in an office 10. The network 105 is connected to an external apparatus via a network 104 such as the Internet.

In the present exemplary embodiment, the image processing apparatus 100 is a multifunction peripheral (MFP) that executes a plurality of functions, for example. More specifically, the image processing apparatus 100 can execute a copy function, a print function, and a sending function, for example.

The client apparatus 101 can be a personal computer (PC), for example. The client apparatus 101 includes standard components of a general-purpose computer, such as a central processing unit (CPU), a random access memory (RAM), a read-only memory (ROM), a hard disk, an external storage device, a network interface, a display, an input device such as a keyboard, and a pointing device such as a mouse. The client apparatus 101 can generally utilize a function of the image processing apparatus 100.

The server 102 is a proxy server, for example, which performs a connection for data communication between the network 104 and the network 105. Furthermore, the database 103 stores object data. The object data will be described in detail later below.

The present exemplary embodiment can include a plurality of offices 10.

Furthermore, the network 104 may be a communication network other than the Internet, such as a LAN, a wide area network (WAN), a telephone line, a dedicated digital line (leased line), an asynchronous transfer mode (ATM), a frame relay line, a communication satellite channel, a cable television line, or data broadcasting wireless line.

Figure 2:
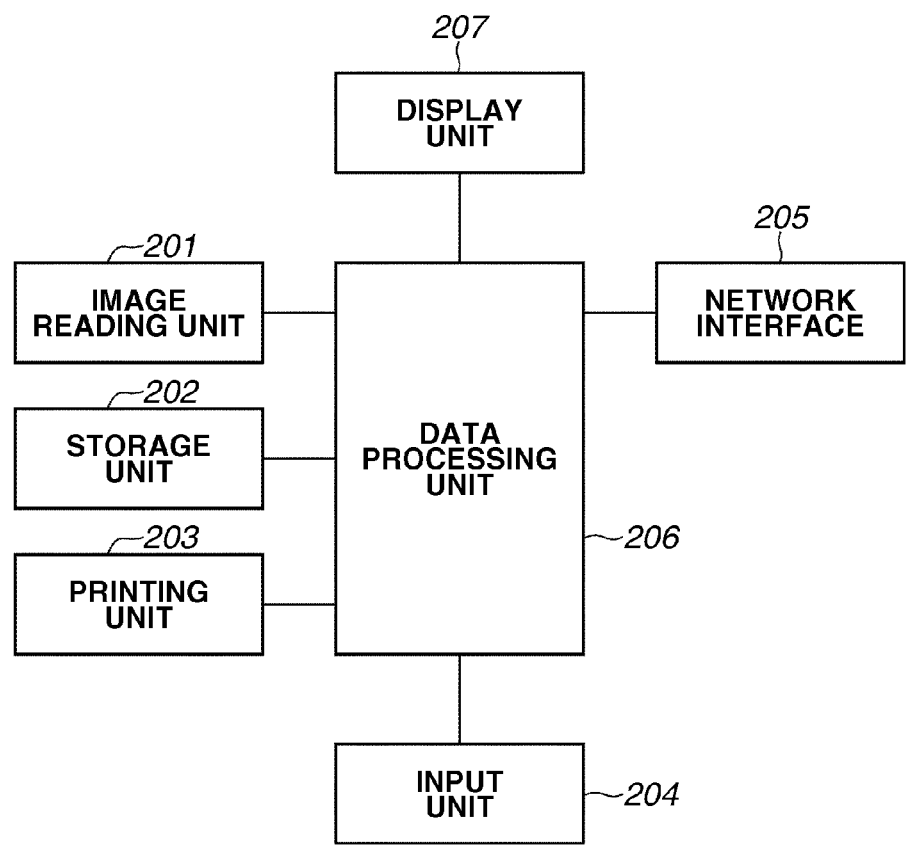
FIG. 2 illustrates an example of a configuration of a functional block in the image processing apparatus illustrated in FIG. 1 according to an exemplary embodiment of the present invention.

FIG. 2 illustrates an example of a configuration of a functional block in an interior of the image processing apparatus 100 illustrated in FIG. 1.

Referring to FIG. 2, the image processing apparatus 100 includes an image reading unit 201, a storage unit 202, a printing unit 203, an input unit 204, a network interface 205, a data processing unit 206, and a display unit 207.

The image reading unit 201 includes an auto document feeder. The image reading unit 201 illuminates an image (images) of one or a plurality of stacked documents with a light beam emitted from a light source (not illustrated). Furthermore, the image reading unit 201 forms an image reflected from the document on a surface of a solid-state image sensor via lenses.

Furthermore, the image reading unit 201 acquires the signal having a bit-map format and obtained by image reading from solid-state imaging sensor as bit-mapped data which has the resolution of 600 dpi or the like.

The image processing apparatus 100 prints an image corresponding to a signal obtained by reading the image from recording medium with the printing unit 203 by using the copy function.

In the case of copying one document image, the signal obtained by reading the image is subjected to image processing in the data processing unit 206, and the recording signal is generated. The generated recording signal is printed by the printing unit 203 on the recording medium.

On the other hand, in the case of copying a plurality of document images, a recording signal for one page is temporarily stored in the storage unit 202, and then the temporarily stored recording signals are sequentially output and printed by the printing unit 203 on the recording medium.

At the time the image processing apparatus 100 performs a data communication via the network interface 205, bit-mapped data acquired from the image reading unit 201 is converted into object data, and then transmitted to the database 103.

Furthermore, the image processing apparatus 100 can receive the object data held in the database 103 and reuse the thus acquired object data. In this case, the image processing apparatus 100 can convert the object data into an image file having a vector data file format such as Extensible Markup Language (XML) paper specification (XPS) and portable document format (PDF) and transfer the converted image file to the client apparatus 101.

In the case where the image processing apparatus 100 implements the print function in the printing unit 203, the image processing apparatus 100 receives print data from the client apparatus 101 via the network interface 205.

Then the image processing apparatus 100 including the processing unit 206 converts the received print data into a recording signal which can be printed by the printing unit 203 and forms an image on a print medium with the printing unit 203.

The input unit 204 is used by a user to operate the image processing apparatus 100. An instruction input by the user is controlled, for example, by a control unit (not illustrated) in the data processing unit 206.

Furthermore, the display unit 207 displays a state of a user input or the image data which is currently processed.

The storage unit 202 includes a storage area for storing object data, an area for storing a word indicating a characteristic of the object, which will be described in detail below, an image processing buffer, and an image editing buffer.

The image processing buffer is used during various image processing operations performed in the data processing unit 206. Furthermore, the image editing buffer is used for storing data obtained by copying the object data as image editing data during the image editing processing performed based on the object data.

Figure 3:
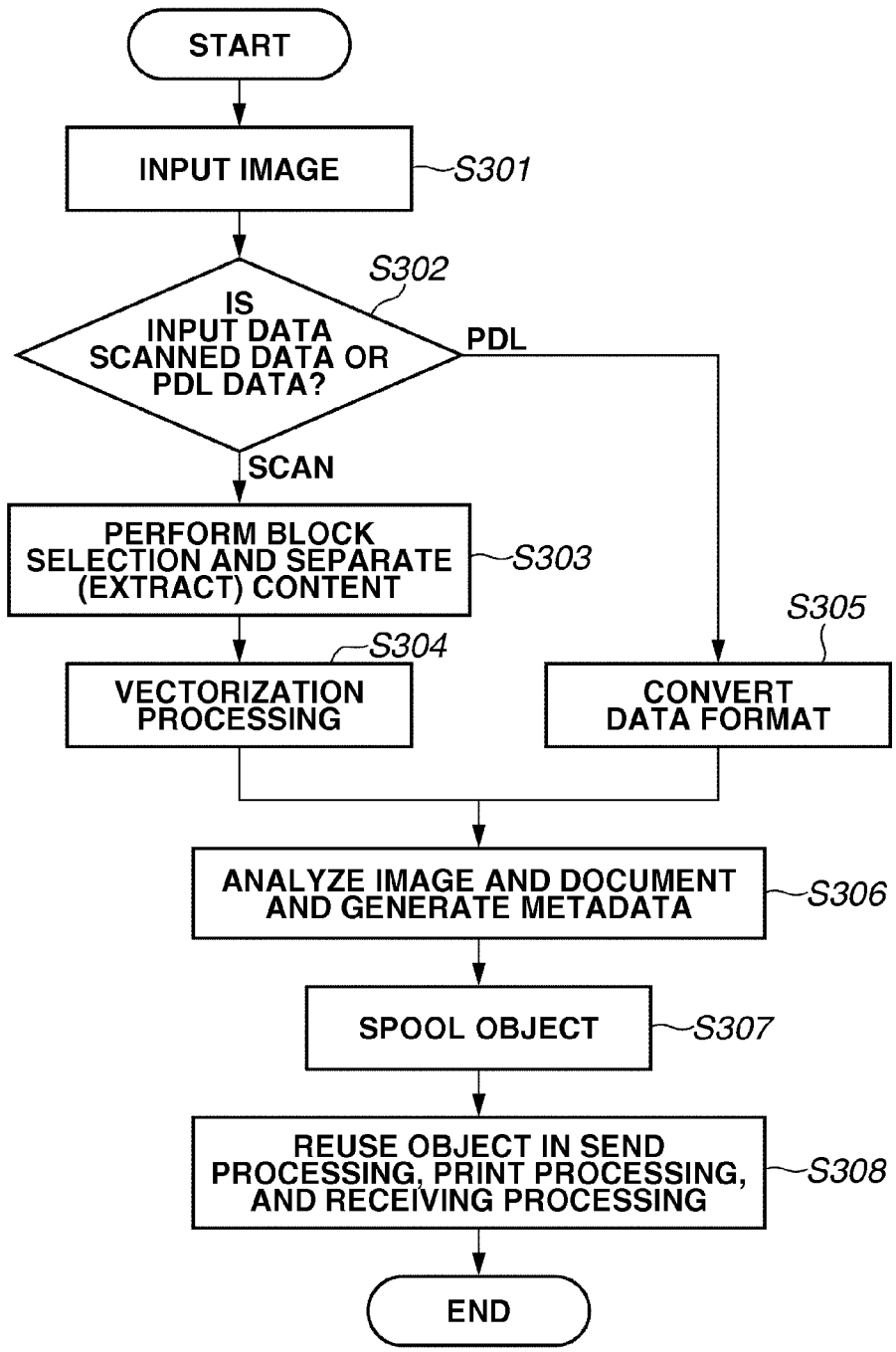
FIG. 3 is a flow chart illustrating an example of processing to be performed in the image processing apparatus according to an exemplary embodiment of the present invention.

FIG. 3 is a flow chart illustrating an example of processing performed by the image processing apparatus 100 according to the present exemplary embodiment. By performing the processing according to the flow chart of FIG. 3, an object is extracted from the image data input by scanning a document or input as PDL data is registered in the storage unit 202 or the database 103.

Furthermore, the registered object can be reused during the sending processing, the print processing, or the receiving processing.

In step S301, in the case of inputting an image obtained by scanning a document, the image reading unit 201 of the image processing apparatus 100 scans and reads a document and obtains a bit-mapped image of the read document. At this time, an image signal of 600 dpi (8 bits), for example, is generated. The generated image signal is then subjected to pre-print processing in the data processing unit 206. Then, image data for one page is stored in the storage unit 202 as bit-mapped data.

Furthermore, in the case of inputting an image as PDL data, the image data for one page is stored in the storage unit 202 as vector data.

In step S302, the data processing unit 206 determines whether scanned image data has been input or PDL data has been input. If it is determined in step S302 that scanned image data has been input, then the processing advances to step S303.

In step S303, the data processing unit 206 performs a block selection with respect to the image data to separate a content of the image data therefrom. More specifically, the data processing unit 206 area-divides the image data stored in the storage unit 202 into a portion including a text or a line drawing and a portion including a halftone image.

Then, the data processing unit 206 separates the text portion or the line drawing portion per each segment including one paragraph (hereinafter simply referred to as a "block"), per each table including a line, or per each graphic including a line, to form an object. The data processing unit 206 separates the halftone image portion into each portion of a block including an image or a block including a background portion, which is separated in a rectangular shape, and forms an object.

In the present exemplary embodiment, a text (character), a graphic (a thin line, a graphic, or a table), and an image are used as information about a characteristic of the object (hereinafter simply referred to as an "attribute"). However, it is not necessary to use all the attributes in the present exemplary embodiment. Other types of attributes can be used according to the usage or purpose of the document.

In step S304, the data processing unit 206 performs vectorization processing per each separated object.

In the present exemplary embodiment, the object that has been determined to have a text attribute is subjected to character recognition using an optical character recognition (OCR). Thus, a character size, a style, and a type of font are recognized to convert the object into font data visually true to the text obtained by scanning the document.

Furthermore, with respect to the object determined to have a graphic attribute, an object such as a table or a graphic, which is constituted by a line, is outlined.

Furthermore, with respect to an object determined to have an image attribute, each object is JPEG-compressed as image data. The vectorization processing performed on each such object is performed based on the object information included in each object. Here, the object data includes metadata and image data and further includes layout data for each object.

On the other hand, if it is determined in step S302 that the image has been input as PDL data, then the processing advances to step S305.

In step S305, the data processing unit 206 converts the input PDL into object data with respect to each object and stores the converted object data in the storage unit 202. In this case, attribute information, metadata, and layout data included in the PDL is converted and stored.

Here, "attribute information" refers to a text attribute, a graphic attribute, or an image attribute. The "metadata" refers to a characteristic of an object, a name of the object, information about the object, or an object identification (ID) (hereinafter referred to as an "ID number").

In step S306, the data processing unit 206 performs an image analysis and an document analysis on each object to correct or modify the metadata generated in step S304 or step S305 and add new information to the metadata.

In step S306, the object data differs with respect to the scan job and a PDL job input in step S301. Accordingly, if the image generated in the scan job and the PDL job is similar image data having a text attribute, a graphic attribute, or an image attribute, the appropriate processing is to be performed on the image data thereafter. More specifically, in the case of an object having a text attribute, the document is summarized based on a result of the document analysis and the resulting summary information is added to metadata as new information.

Furthermore, in the case of an object having a graphic attribute, detailed information such as a characteristic amount of the object, a name of the object, or whether the object is a graphic, table, or a line drawing obtained as a result of the image analysis is added to metadata as new information.

Furthermore, in the case of an object having an image attribute, detailed information such as a characteristic amount of the object, a name of the object, or whether the object is an image of a person or an image of a landscape is added to metadata as new information.

Here, it is useful that other information about the object is added to metadata as new information. Furthermore, it is further useful to add information such as "FOR INTERNAL USE ONLY" to metadata of all the objects included in the image if a word such as "FOR INTERNAL USE ONLY" is detected in the input image.

In this case, except "FOR INTERNAL USE ONLY" in the document image, it is useful to perform the similar processing if a word related to security is detected therein.

In step S307, the data processing unit 206 spools the object data generated in step S306 in the storage unit 202. At the same time, the data processing unit 206 stores the spooled data in the database 103 or the storage unit 202 in a state in which the object data can be used (without restriction of use thereof). In this case, the object ID according to a registration destination of the object is added to metadata.

However, if an object ID has been already included in the object data before the registration of the object, then the data processing unit 206 does not register the object as an object whose utilization is to be restricted. With respect to the registration of an object, it is also useful to use other determination method for determining whether the object data can be registered. For example, the object may not be registered if the same or similar object data has been already registered in the storage unit 202.

In step S308, the data processing unit 206 performs image processing such as the sending processing, the print processing, or the receiving processing. Each processing will be described in detail below.

Furthermore, if the processing in the flow chart of FIG. 3 is performed to register the object data in a storage area of the storage unit 202 or the database 103, then the processing ends without performing step S308.

Figure 4:
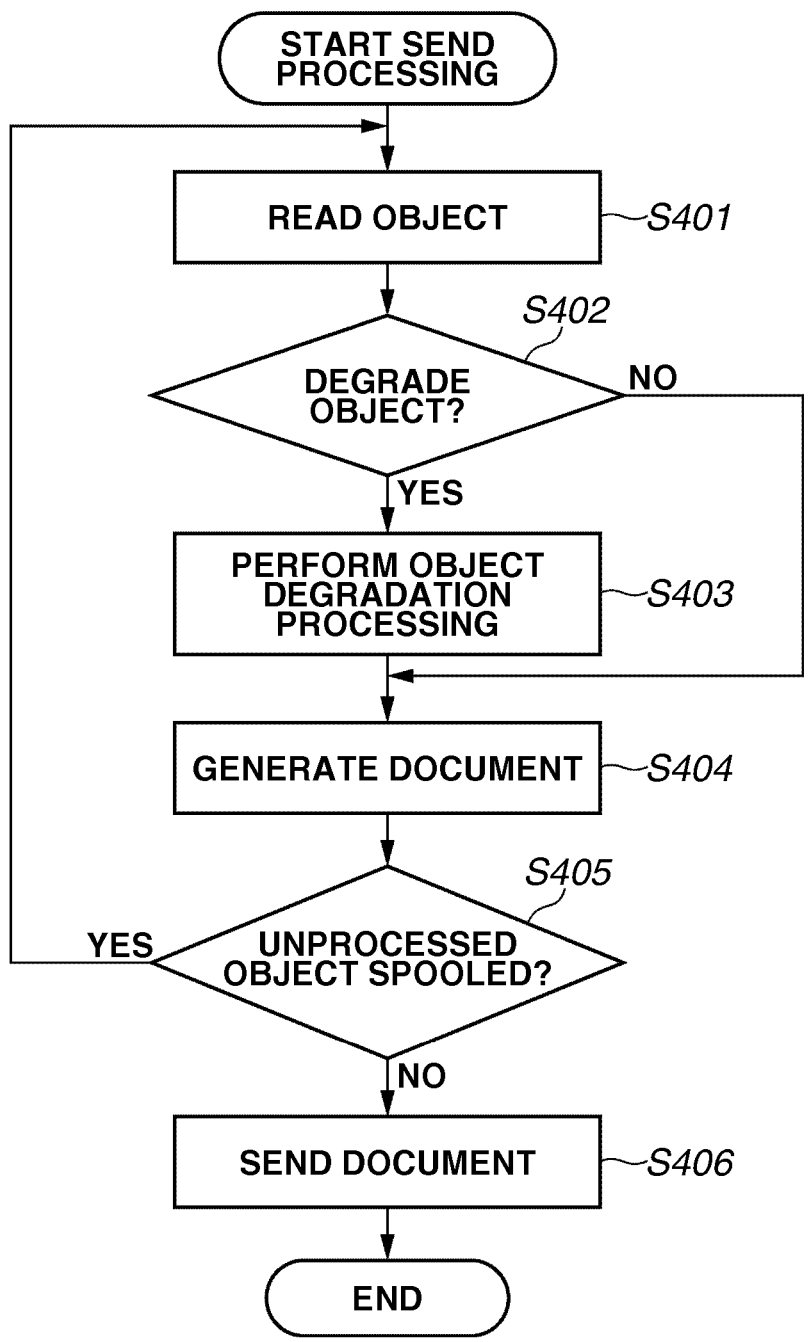
FIG. 4 is a flow chart illustrating an example of sending processing illustrated in FIG. 3 according to an exemplary embodiment of the present invention.

FIG. 4 is a flow chart illustrating an example of sending processing illustrated in FIG. 3. According to the processing of the flow chart of FIG. 4, when the document that the user desires is sent from the image processing apparatus 100 to an external environment, a document whose security has been protected can be generated without requiring a user operation.

Referring to FIG. 4, in step S401, the data processing unit 206 reads object data spooled in the storage unit 202 according to information about the document designated by the user to perform the sending processing.

In step S402, the data processing unit 206 uses a determination method for the object data, which will be described in detail below, to determine whether the read object is an object whose utilization is to be restricted.

If it is determined in step S402 that the object is an object whose utilization is to be restricted (YES in step S402), then the processing advances to step S403. In step S403, the data processing unit 206 performs the degradation processing according to a level of an attribute of the object and the word indicating a characteristic of the object. The degradation processing will be described in detail below.

After the degradation processing is carried out in step S403, the processing advances to step S404.

On the other hand, if it is determined in step S402 that the read object is not an object whose utilization is to be restricted (NO in step S402), then the data processing unit 206 deletes the object ID. Then, the processing advances to step S404.

In step S404, the data processing unit 206 generates a document, which is the sending information, based on layout data included in the object data.

In step S405, the data processing unit 206 determines whether unprocessed object data is spooled in the storage unit 202.

If it is determined in step S405 that the unprocessed object data is spooled in the storage unit 202 (YES in step S405), then, the data processing unit 206 repeats the processing in step S401 through S404.

On the other hand, if it is determined in step S405 that no unprocessed object data is spooled in the storage unit 202 (NO in step S405), then the processing advances to step S406.

In step S406, the data processing unit 206 converts the generated document into an arbitrary external format and sends the converted document to a sending destination via the network interface 205.

Here, a bit-map format such as Tag Image File Format (TIFF) or JPEG or a vector data format such as portable document format (PDF) or XPS can be used.

Figure 5:
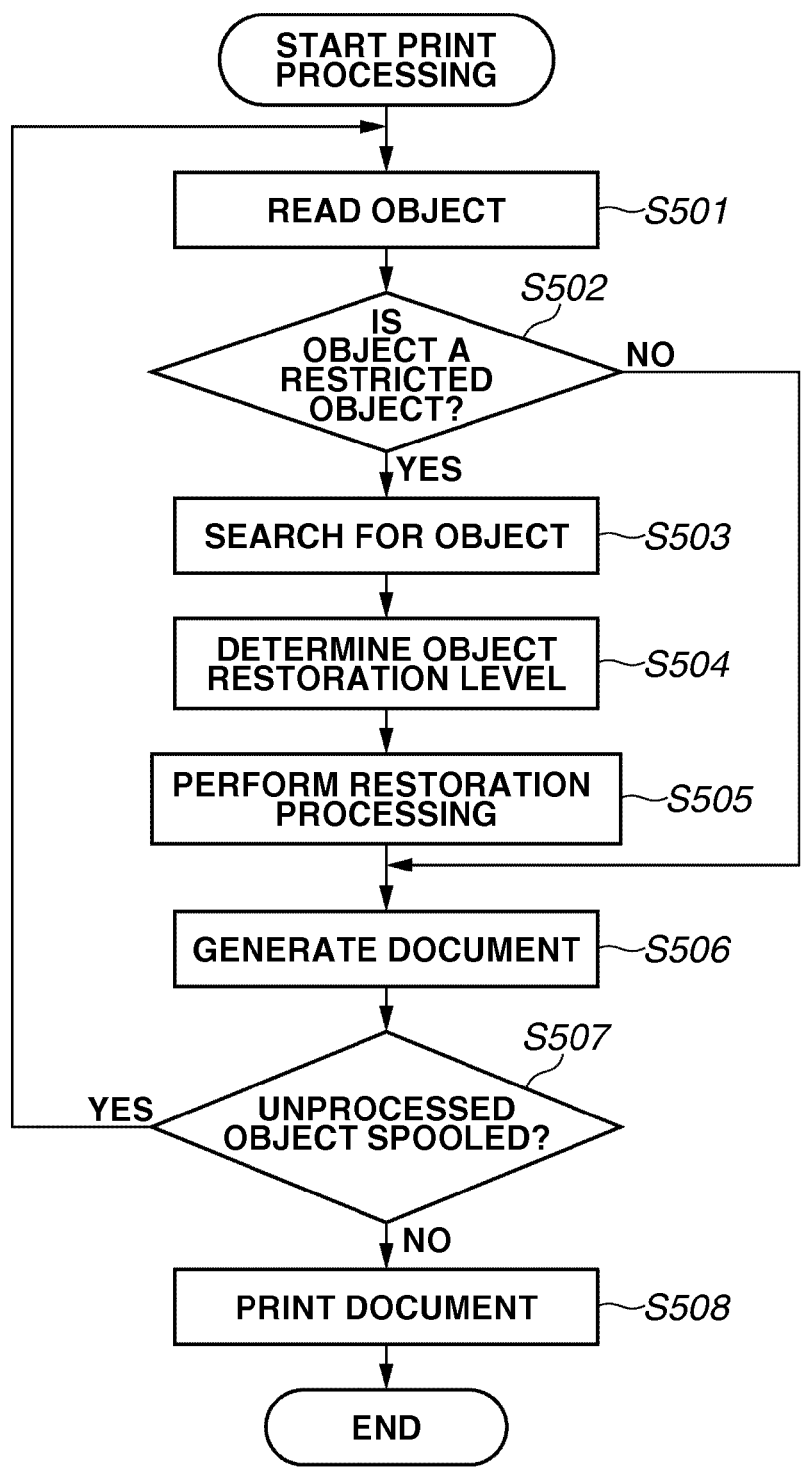
FIG. 5 is a flowchart illustrating an example of print processing illustrated in FIG. 3 according to an exemplary embodiment of the present invention.

FIG. 5 is a flowchart illustrating an example of print processing illustrated in FIG. 3. According to processing in the flow chart of FIG. 5, the object is restored and printed according to information about the user who desires to perform printing of the object in the case where a security-protected document (hereinafter simply referred to as a "document to be printed") is externally input and printed.

In step S501, the data processing unit 206 reads object data spooled in the storage unit 202 corresponding to the object included in the document to be printed.

In step S502, the data processing unit 206 determines whether the object included in the document to be printed is an object whose utilization is to be restricted. More specifically, the data processing unit 206 determines whether an object ID exists in the metadata included in object data.

If it is determined in step S502 that the object is an object whose utilization is to be restricted (YES in step S502), then the processing advances to step S503.

On the other hand, if it is determined in step S502 that the object is not an object whose utilization is to be restricted (NO in step S502), then the processing advances to step S506.

In step S503, the data processing unit 206 extracts the object ID from the metadata of object data in the document to be printed. Based on the extracted object ID, the data processing unit 206 searches for the registered object data over the storage unit 202 and the database 103.

In step S504, the data processing unit 206 determines the restoration level according to the user information, an attribute of the object, and the security level of the word indicating a characteristic of the object. Then, the processing advances to step S505. In step S505, the data processing unit 206 performs the restoration processing for restoring the object.

In step S506, the data processing unit 206 generates a document that is to be used as print data based on the layout data included in the object.

In step S507, the data processing unit 206 determines whether unprocessed object data is spooled in the storage unit 202.

If it is determined in step S507 that unprocessed object data is spooled in the storage unit 202 (YES in step S507), then, the data processing unit 206 repeats the processing in step S501 through S506.

On the other hand, if it is determined in step S507 that no unprocessed object data is spooled in the storage unit 202 (NO in step S507), then the processing advances to step S508.

In step S508, the data processing unit 206 converts the print data into a recording signal which can be printed by the printing unit 203 to form an image on the print medium.

Figure 6:
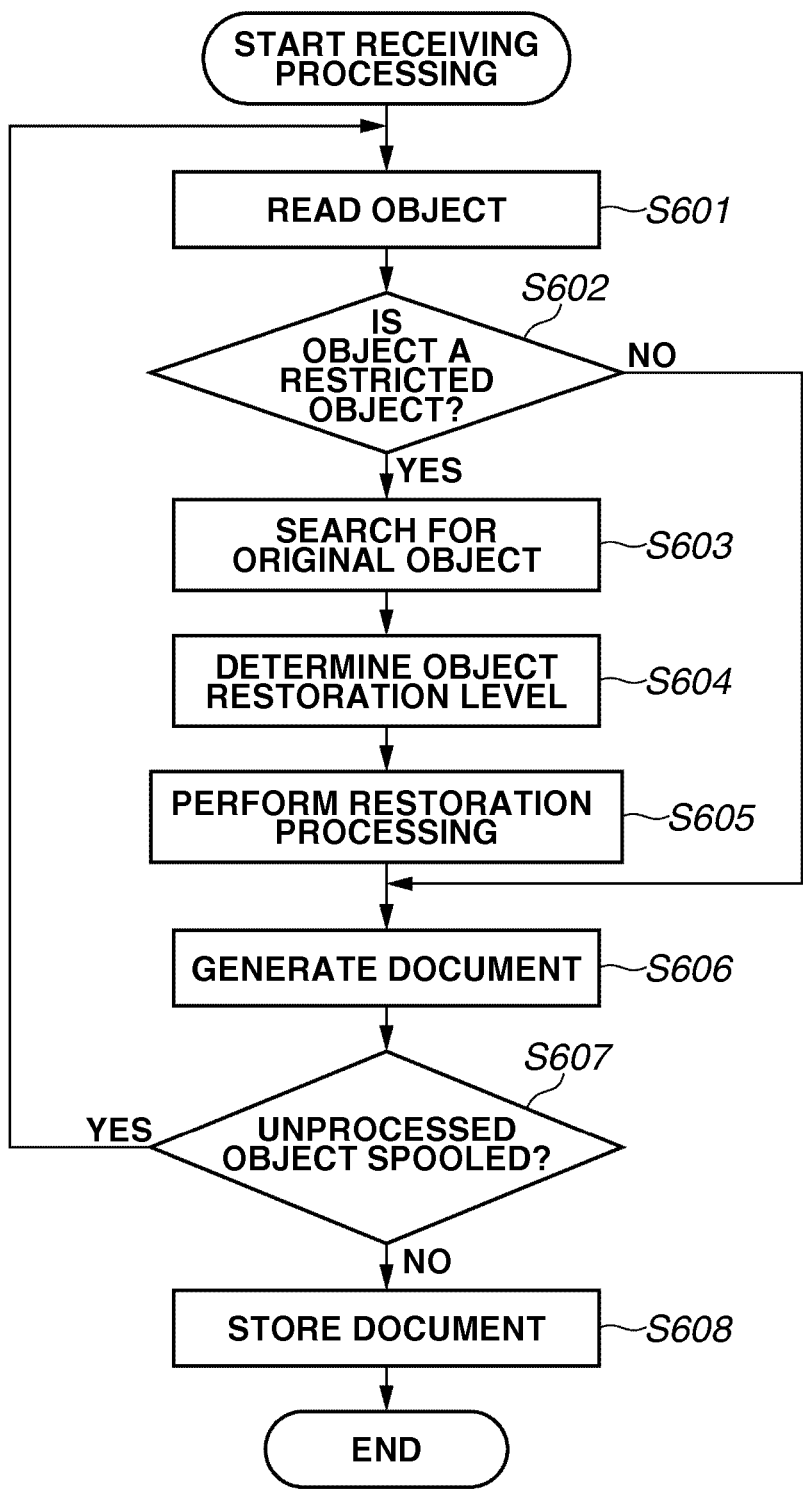
FIG. 6 is a flow chart illustrating an example of receiving processing illustrated in FIG. 3 according to an exemplary embodiment of the present invention.

FIG. 6 is a flow chart illustrating an example of receiving processing illustrated in FIG. 3. According to the processing in the flow chart of FIG. 6, an object is restored and stored according to information about the user who desires to print the document in the case where the security-protected document (hereinafter simply referred to as a "document to be received") is externally input.

In step S601, the data processing unit 206 reads object data spooled in the storage unit 202 corresponding to the object included in the document to be received.

In step S602, the data processing unit 206 determines whether the object data included in the document to be received is an object whose utilization is to be restricted. More specifically, the data processing unit 206 determines whether an object ID exists in the metadata included in object data.

If it is determined in step S602 that the object is an object whose utilization is to be restricted (YES in step S602), then the processing advances to step S603.

On the other hand, if it is determined in step S602 that the object is not an object whose utilization is to be restricted (NO in step S602), then the processing advances to step S606.

In step S603, the data processing unit 206 extracts the object ID from the metadata of the object data in the document to be received. Then, according to the extracted object ID, the data processing unit 206 searches for registered object data over the storage unit 202 and the database 103.

In step S604, the data processing unit 206 determines the restoration level according to the user information, an attribute of the object, and the security level of the word indicating a characteristic of the object. Then, the processing advances to step S605. In step S605, the data processing unit 206 performs the restoration processing for restoring the object.

In step S606, the data processing unit 206 generates a document to be the receiving data based on the layout data included in the object.

In step S607, the data processing unit 206 determines whether unprocessed object data is spooled in the storage unit 202.

If it is determined in step S607 that unprocessed object data is spooled in the storage unit 202 (YES in step S607), then the data processing unit 206 repeats the processing in step S601 through S606.

On the other hand, if it is determined in step S607 that no unprocessed object data is spooled in the storage unit 202 (NO in step S607), then the processing advances to step S608.

In step S608, the data processing unit 206 completes the determination and the restoration processing for all object data and stores the data of a document for each page in the storage unit 202 as the receiving data.

Here, the object data and the metadata according to the present exemplary embodiment will be described in detail.

Figure 7:
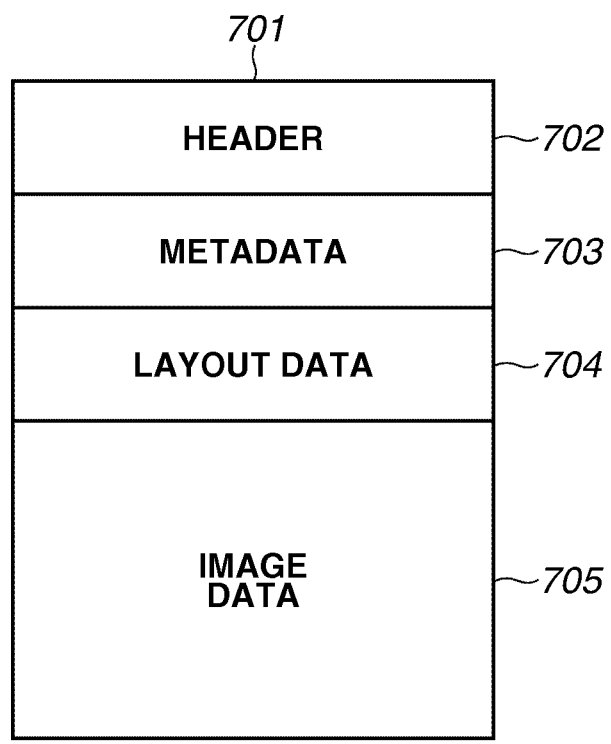
FIG. 7 illustrates an example of a structure of object data according to an exemplary embodiment of the present invention.

FIG. 7 illustrates an example of a structure of object data. Referring to FIG. 7, object data 701 includes a header 702, metadata 703, layout data 704 and image data 705.

The header 702 includes information about a size of the object data such as a height and the width thereof and information about a data format of bit-mapped data and vector data. The metadata 703 includes information about an object such as an attribute of the object, information used for searching for an object and an object ID The layout data 704 includes information indicating a location of the object in the document. The image data 705 is actual data of the object, and is presented in a data format such as bit-mapped data or vector data described in the header 702.

Figure 8:
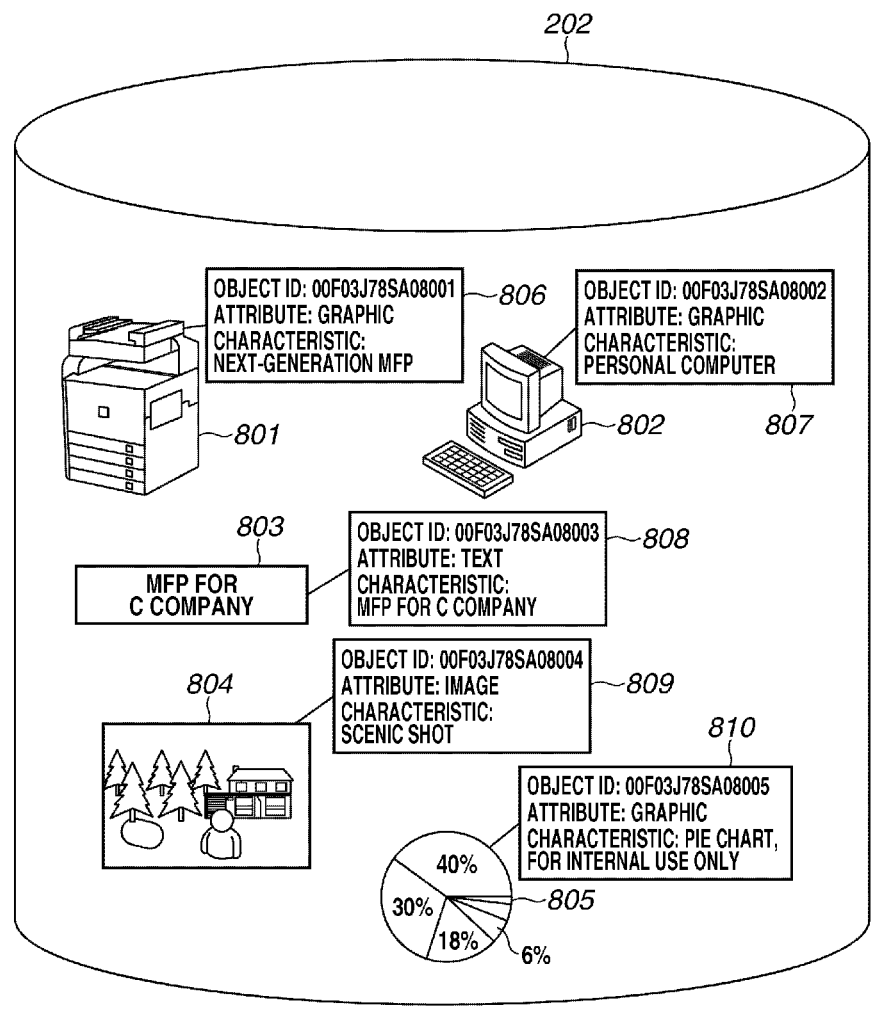
FIG. 8 illustrates an example of object data or metadata registered or spooled in a storage unit according to an exemplary embodiment of the present invention.

FIG. 8 illustrates an example of object data and metadata registered or spooled in the storage unit 202.

Referring to FIG. 8, objects 801, 802, 803, 804, and 805 are registered in the storage unit 202. Each object data includes metadata 806, 807, 808, 809, and 810, respectively. Metadata 806, 807, 808, 809, and 810 each include an object ID, an attribute of the object, and a word indicating information about a characteristic of the object, respectively, as illustrated in FIG. 8.

Here, a unique object ID is provided to each object. In the present exemplary embodiment, the object ID includes a physical address of the network interface 205 and a number of registered object data at the time of registration.

Here, a unique number such as a model number of an MFP can be used instead of the physical address of the network interface 205.

Now, the determination method performed on the object in step S402 illustrated in FIG. 4 is described with reference to FIGS. 8 and 9.

In the example illustrated in FIG. 9, a table previously stores the word indicating a characteristic of the object and the security level of the object associated with each other.

The table illustrated in FIG. 9 is previously stored in the storage unit 202 of the image processing apparatus 100 and has a hierarchical structure.

In the present exemplary embodiment, the word indicating a characteristic of the object is classified into three classes, namely, a level 1, a level 2, and a level 3, in an order of ascending security levels. The word indicating a characteristic of the object is compared with the metadata included in the object data. More specifically, it is determined whether information exists that matches the word indicating a characteristic of the object in the metadata.

If it is determined that information matching the word indicating a characteristic of the object exists, then the data processing unit 206 performs degradation processing on the object according to the level of the word indicating a characteristic of the matched object.

Furthermore, if it is determined that the information matches a plurality of words indicating a characteristic of the object, then, the data processing unit 206 prioritizes the word indicating a characteristic of the object having a higher security level.

Here, a character string is used as the word indicating a characteristic of the object illustrated in FIG. 9. However, information related to the object data such as a histogram or an average value of pixel values indicating characteristics of bit-mapped data can also be used instead of the character string. The table indicating a relationship between the word indicating a characteristic of the object and the hierarchical security level of the object associated with each other is hereinafter referred to as a "first table".

Returning to FIG. 8, the object 801 includes a word indicating the characteristic of the object of level 3 "next generation MFP". Accordingly, in step S402, the object 801 is determined to be an object of level 3 whose utilization is to be restricted.

Furthermore, with respect to the object 802, its metadata 807 does not include any word indicating the characteristic of the object illustrated in FIG. 9. That is, the object 802 is recognized as an object having a normal level. Thus, in step S402, the object 802 is not determined to be an object whose utilization is to be restricted.

In the similar say, the object 803 is determined as an object whose utilization is to be restricted at a level 2. The object 804 is determined as an object whose utilization is to be restricted at a level 1. The object 805 is determined as an object whose utilization is to be restricted at a level 3.

The object degradation processing performed in step S403 (FIG. 4) will be described with reference to FIG. 10, FIG. 11, and FIG. 12.

Figure 10:
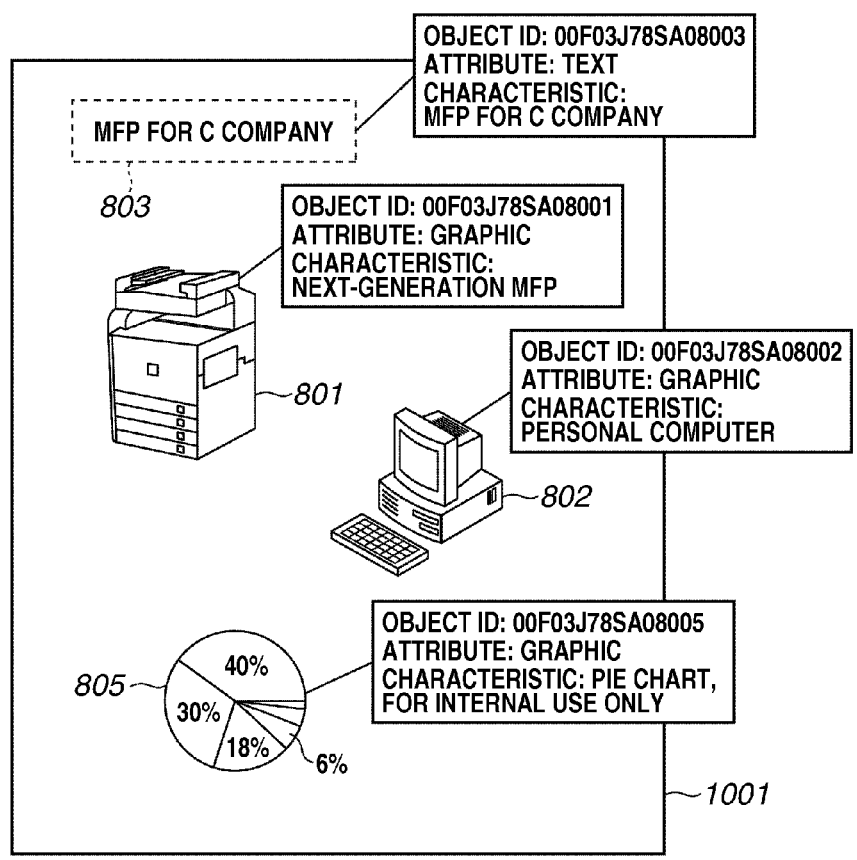
FIG. 10 illustrates an example of a document before being subjected to sending processing according to an exemplary embodiment of the present invention.

FIG. 10 illustrates an example of a document before being subjected to the sending processing. FIG. 11 illustrates the degradation level corresponding to an attribute of the object and the security level. FIG. 12 illustrates an example of a document that is degraded by the degradation method and sent in the degraded state.

Referring to FIG. 10, a document 1001 includes the objects 801, 802, 803, and 805.

Here, in step S403 (FIG. 4), the object 801 is determined as an object whose utilization is to be restricted at a level 3. Similarly, the object 802 is determined as a normal object. The objects 803 and 805 are determined as an object whose utilization is to be restricted at levels 2 and 3, respectively.

In the present exemplary embodiment, as illustrated in FIG. 11, the degradation level differs according to an attribute of the object and the security level. The table illustrated in FIG. 11 is previously stored in the storage unit 202 of the image processing apparatus 100.

Referring to FIG. 11, the object at the security level 1 including an image attribute is degraded by a resolution degradation. Furthermore, the object at the security level 2 is degraded by a resolution degradation. The object at the security level 3 is degraded by deletion.

Here, the "resolution degradation" refers to conversion of the resolution of the object from 600 dpi, which is the resolution for bit-mapped data, into a bit-mapped data of 72 dpi, by downsampling.

Furthermore, the "deletion" refers to deleting of the image data included in the object data of the object 801.

As illustrated in FIG. 11, the object at the security level 1 including a graphic attribute is degraded by the conversion into bit-map. Furthermore, the object at the security level 2 is degraded by the resolution degradation. The object at the security level 3 is degraded by the deletion.

Here, "conversion into bit-map" refers to processing for converting the image data of a vector format included in the object data of the object having a graphic attribute, into a bit-map format by rendering with the resolution of 600 dpi. The resolution degradation and the deletion are performed by the same method as performed on the object having an image attribute.

As illustrated in FIG. 11, the object at the security level 1 having a text attribute is degraded by the conversion into bit-map.

Furthermore, the object at the security level 2 is degraded by deleting a character string matching the word indicating a characteristic of the object, from the character string indicating the image data included in the object data.

Furthermore, the object at the security level 3 is degraded by a whole text deletion to delete all the image data that is included in the object data.

In the present exemplary embodiment, the object ID included in the metadata of the object data that is determined as a normal object (an object whose utilization is not to be restricted) is deleted in step S402 (FIG. 4).

The table indicating the relationship between the security level and the information about an attribute of the object is hereinafter referred to as a "second table". Referring to FIG. 11, the degradation level is determined according to a combination of an attribute of the object and the security level indicated by the word indicating the characteristic of the object.

The word indicating the characteristic of the object and the degradation level are associated with each other according to the content of the first and the second tables. Accordingly, the two tables associate the word indicating the characteristic of the object and the degradation level.

Figure 12:
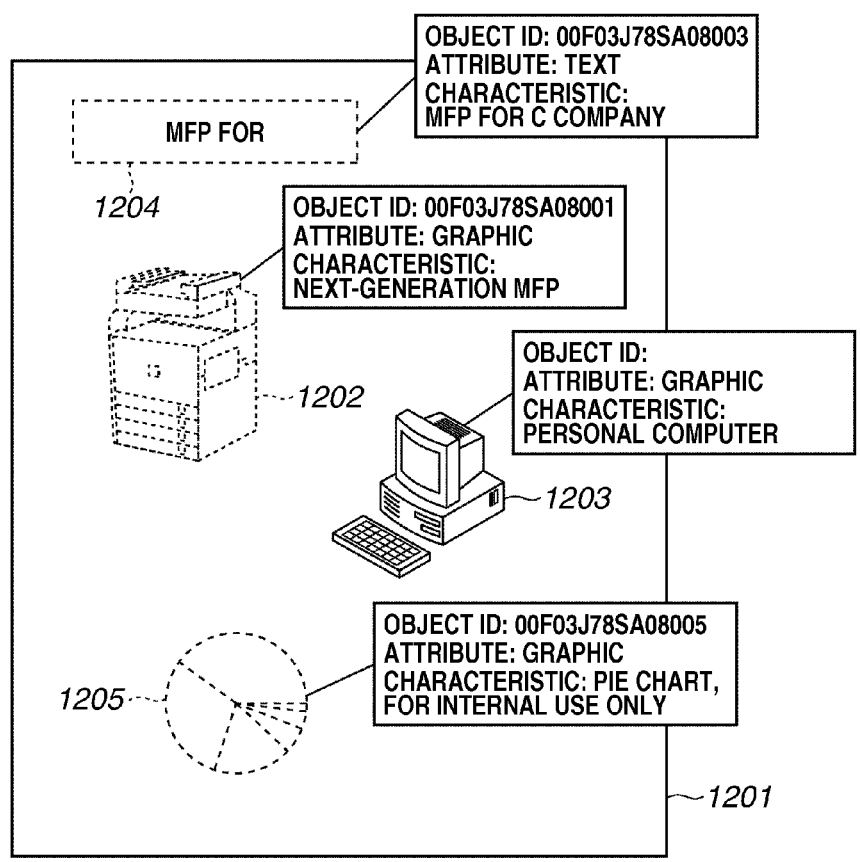
FIG. 12 illustrates an example of a document degraded by a degradation method and sent in the degraded state according to an exemplary embodiment of the present invention.

A document 1201 illustrated in FIG. 12, namely, the sending document is generated by degrading the object included in a document 1001 in the degradation method and converting the degraded document 1001 into an external format such as XPS. As illustrated in FIG. 12, image data has been deleted from an object 1202 because it has been determined to be a level 3 object.

Furthermore, the object ID included in the metadata is deleted from an object 1203 because it has been determined to be an object of a normal level.

Furthermore, with respect to an object 1204, only the word indicating the characteristic of the object is deleted therefrom because the object 1204 has been determined to be a level 2 object.

Furthermore, the image data is deleted from an object 1205 because the object 1205 has been determined to be a level 3 object.

In the present exemplary embodiment, the downsampling is performed by converting the resolution of the object to a resolution lower than the resolution of the original object. Accordingly, the resolution of the object may be converted to a resolution other than 72 dpi.

Furthermore, as the degradation method illustrated in FIG. 11, methods other than the conversion into bit-map, the resolution degradation, or the deletion can be used. As such other degradation methods, it is useful to use a method such as a monochromization, outlining, degradation into broken lines, replacement, or OCR-deletion can be used.

Here the "monochromization" refers to converting the image data into image data having only brightness information in the case where the image data 705 includes color information. Furthermore, the "outlining" refers to processing for visualizing only an outline of the image data 705.

The "degradation into broken lines" refers to processing for performing quantization with a low screen ruling of about 50 lines by compressing the tone of the image data 705 that has been converted into bit-map to about 50%. The "replacement" refers to processing for replacing only the image data 705 with the image data 705 of other object data 701.

The "OCR-deletion" refers to processing for hindering a text search using a result of the OCR processing by deleting the OCR information only with respect to an object having a text attribute.

Now, object data restoration processing performed in step S505 (FIG. 5) and step S605 (FIG. 6) will be described in detail below with reference to FIGS. 12, 13, 14, 15, and 16.

Figure 13:
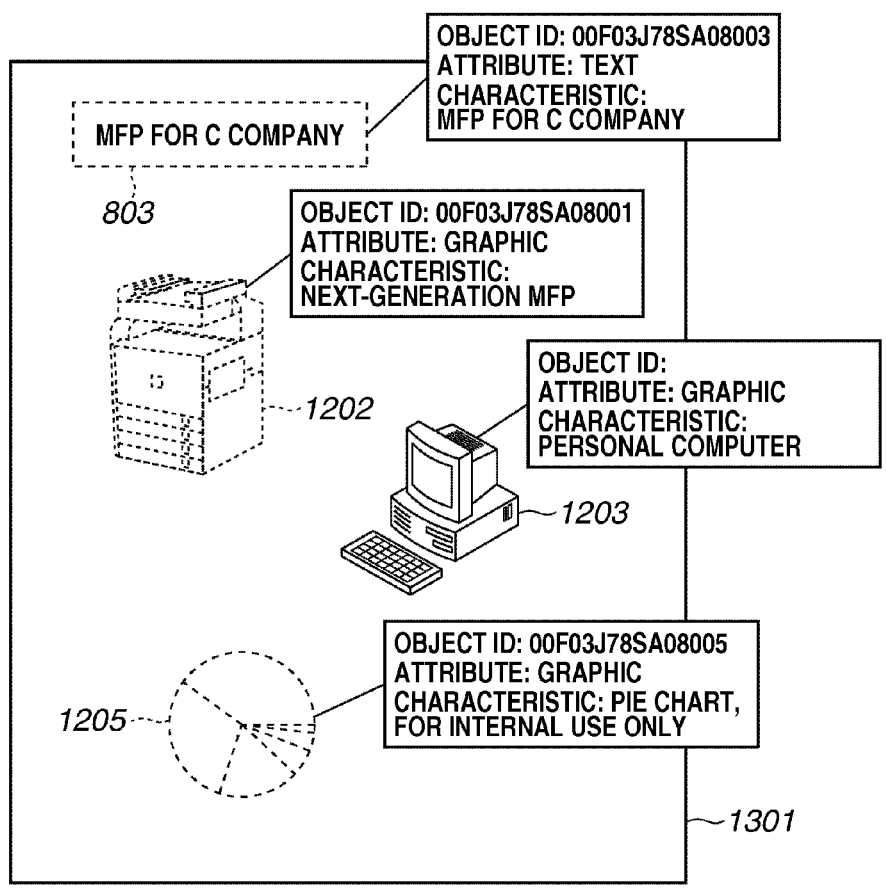
FIG. 13 illustrates an example of a document after being subjected to restoration processing by a user A according to an exemplary embodiment of the present invention.
Figure 14:
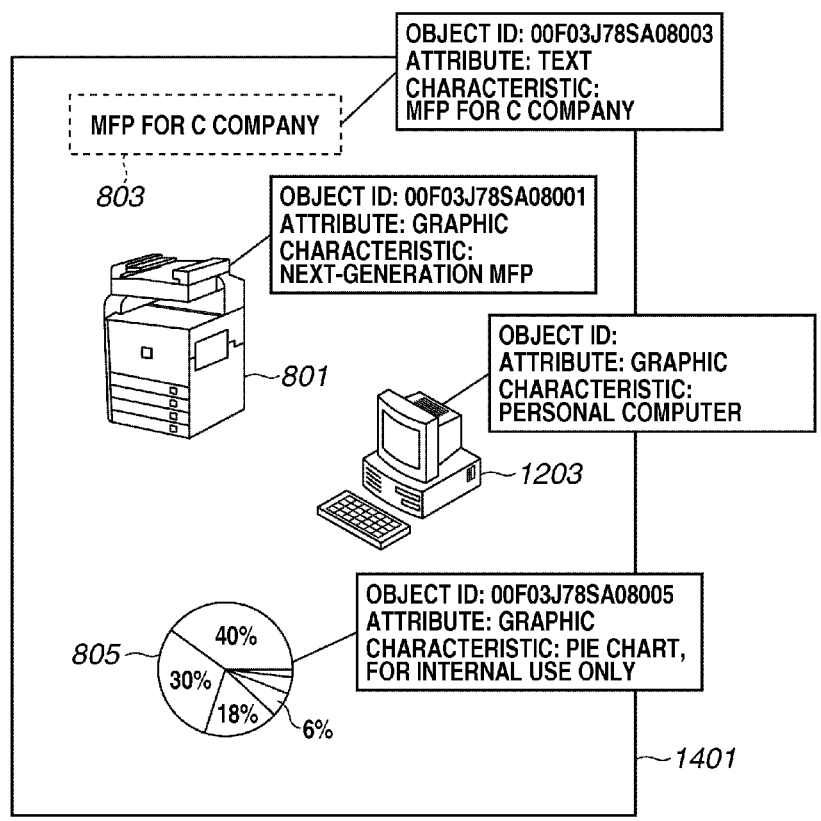
FIG. 14 illustrates an example of a document after being subjected to the restoration processing by a user B according to an exemplary embodiment of the present invention.
Figure 16:
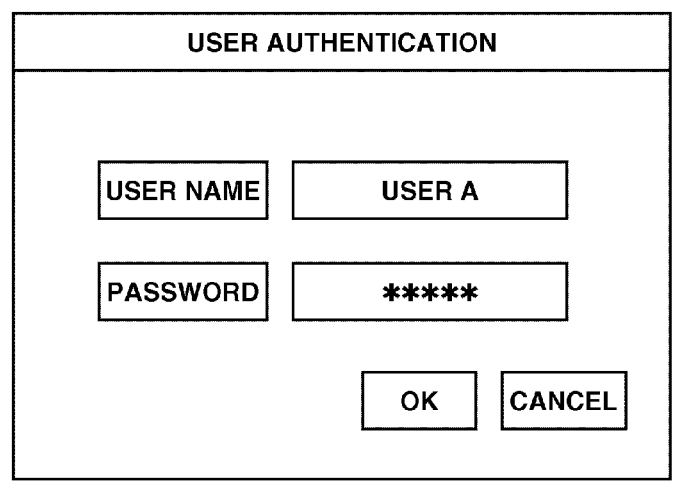
FIG. 16 illustrates an example of a user interface used for user authentication according to an exemplary embodiment of the present invention.

FIG. 13 illustrates an example of a document after being subjected to the restoration processing by the user A. FIG. 14 illustrates an example of a document after being subjected to the restoration processing by the user B. FIG. 15 illustrates the restoration level corresponding to user information and an attribute of the object. FIG. 16 illustrates an example of a user interface used for the user authentication.

For example, suppose that a security-protected document 1201 (FIG. 12) is to be sent to the image processing apparatus 100 as PDL and printed or stored therein. This case is equivalent to a case where an image processing apparatus sends a security-protected document to other image processing apparatus to print or store the document therein.

The document 1201 is converted into object data by the data processing unit 206 of the image processing apparatus 100. In this case, for example, the user interface illustrated in FIG. 16 is displayed in the display unit 207 of the client apparatus 101 or the image processing apparatus 100, and the user inputs a user name and a password (hereinafter simply referred to as "user information") via the display unit 207.

The image processing apparatus 100 stores input user information in the storage unit 202, refers to the user table holding information about an authentic user to perform user authentication.

FIG. 12 illustrates a result of extracting object data from the document 1201. Referring to FIG. 12, the document 1201 includes the objects 1202, 1203, 1204, and 1205. The data processing unit 206 determines whether an object ID exists (is registered) with respect to each object in steps S502 and S602.

If it is determined that an object ID exists, then the data processing unit 206 searches the storage unit 202 and the database 103 according to the extracted object ID. For example, with respect to the object 1202, the object 801 having the same object ID exists in the storage unit 202.

In the present exemplary embodiment, the data processing unit 206 determines the restoration level corresponding to the user information, the attribute of the object of user information, and the word indicating the characteristic of the object. Then, the data processing unit 206 refers to the object stored in the storage unit 202 to restore the object included in the document.

Here, in the case where the user A views the document 1201, the data processing unit 206 acquires an access right of the user A from a table illustrated in FIG. 15. In this case, the user A has an access right up to level 2 with respect to an object having an image attribute, a graphic attribute, or a text attribute.

The object 801 has a graphic attribute and includes a word indicating the characteristic of the object at the level 3. Therefore, the object 1202 is not restored because the user A does not have an access right.

The same processing is performed on the objects 1203, 1204, and 1205. As a result, as illustrated in FIG. 13, a restored document 1301 is generated.

Here, only the object 1204 is completely restored as the object 803. The "complete restoration" refers to replacement of the object 1204 included in the sent document 1201 with the object 803 stored in the storage unit 202.

On the other hand, in the case where the user B views the document 1201, the user B has an access right up to level 3 with respect to an object having an image attribute, a graphic attribute, or a text attribute. Therefore, the object 1202, 1204, or 1205 having the object ID is completely restored to generate a document 1401 (FIG. 14).

A table illustrated in FIG. 15 indicating a relationship between the information about an attribute of the object and the user information is hereinafter referred to as a "third table".

In the present exemplary embodiment, as illustrated in FIG. 15, the resolution degradation is used other than the complete restoration as a restoration method.

In the present exemplary embodiment, the "resolution degradation" refers to downsampling of the resolution of the bit-mapped data from 600 dpi to 72 dpi. In this case, the object that has been deleted from the sent document is restored as the image data having a low resolution.

Furthermore, in the present exemplary embodiment, the monochromization can be used as other restoration methods. The "monochromization" refers to converting the object including color information into an object having only brightness information. For example, the object deleted from the sent document is restored as monochromatic object instead of as color object. Furthermore, methods other than those described above can be used as the restoration method.

As described above, according to the present exemplary embodiment, in the case where a document whose object has been deleted is received, for a specific user, the received document is printed with the complete restoration. However, for another user, the received document is printed with a low resolution without performing the complete restoration. Thus, the present exemplary embodiment can implement a hierarchical restoration method.

Note that in the present exemplary embodiment, the user may be handled as a guest if the user name is not included in a user table describing information about authentic users at the time of the user authentication. In this case, an access right set for a guest user can be used as illustrated in FIG. 15. In the example illustrated in FIG. 15, if the guest performs printing, the degraded object is printed as it is.

FIG. 17 illustrates an example of a configuration of another system including the image processing apparatus according to the present exemplary embodiment. The system illustrated in FIG. 17 differs from the system illustrated in FIG. 1 in that a plurality of the image processing apparatuses 1701 and databases 1705 and a management server 1706 are connected with a network 1707.

If each image processing apparatus 1701 and database 1705 includes a table illustrated in FIGS. 9, 11, and 15, then the security levels set in each image processing apparatus may differ from each other.

As a result, the maintenance ability of the table data may decrease. In order to prevent this, in the example illustrated in FIG. 17 having the above-described configuration, a management server 1706 is provided which manages the table data illustrated in FIGS. 9, 11, and 15.

In the example illustrated in FIG. 17 having the above-described configuration, contrary to the system having the configuration illustrated in FIG. 1, when the object is determined during the sending processing in step S402 (FIG. 4), the data processing unit 206 makes the determination by referring to the table illustrated in FIG. 9 previously set in the management server 1706 as a storage area.

Also during the degradation processing in step S403, the data processing unit 206 refers to the table illustrated in FIG.

11 previously stored in the management server 1706 to perform the degradation processing.

Furthermore, also during the restoration in the print processing in steps S504 and S604, the data processing unit 206 refers to the table in FIG. 15 previously stored in the management server 1706 to perform the restoration.

As described above, in the present exemplary embodiment, an object is extracted from the document input from an external apparatus and the extracted object is stored in the storage area together with the metadata.

When the document is sent, the stored objects are read and compared with the word indicating the characteristic of the object that has been previously set. If the read object matches the word indicating the characteristic of the object, then the data processing unit 206 performs the object degradation processing. Thus, the present exemplary embodiment can achieve an automatic object security protection and implement a hierarchical security corresponding to the object attribute and the word indicating the characteristic of the object at the time of sending a document.

Furthermore, at the time of receiving or printing the document, the present exemplary embodiment can flexibly restore the object according to the user information.

Furthermore, in the case of sending to an external environment a document including an object whose utilization is to be restricted, a user can view the object only in a degraded state if the user cannot access the original object stored in the storage unit or information stored in the database. Accordingly, the present exemplary embodiment can provide a high security for each object.

Furthermore, according to the present exemplary embodiment, the metadata used in restoring the degraded object is not visible to the user. Thus, the user cannot easily recognize that the document includes confidential information.

In addition, the functions according to the embodiments described above can be implemented not only by executing the program code read by the computer, but also implemented by the processing in which an operating system (OS) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-246091 filed Sep. 21, 2007, which is hereby incorporated by reference herein in its entirety.

What is claimed is:

1. An information processing apparatus that creates a security-protected document to be output based on a determined security level assigned to an object included in an input document without utilizing encryption/decryption or requiring a user to perform an operation, the information processing apparatus comprising:

a generation unit configured to extract the object from the input document and store the extracted object in a storage area;

an analysis unit configured to analyze the extracted object, update/correct existing metadata information already affiliated with the extracted object, and generate new metadata information identifying an attribute correlated with characteristic information pertaining to the extracted object, wherein the characteristic information derived from an analysis result is added to the existing metadata information associated with the extracted object;

a determination unit configured to determine a degradation level for the extracted object in accordance with an analysis result of the extracted object by the analysis unit; and a degradation unit configured to degrade, in a case that the information processing apparatus performs output processing using the extracted object stored in the storage area, the extracted object according to the degradation level determined by the determination unit, and if it is determined that information matching the attribute indicating a characteristic of the object exists, perform degradation processing on the object according to the level of the attribute indicating a characteristic of the matched object; and a storage unit configured to store a table that previously stores an attribute indicating a characteristic of the object which had been extracted from the document and a security level associated with each other, wherein the degradation level is determined by correlating the identified attribute of the extracted object identified in the analysis result, with a determined security level assigned to the identified attribute of the extracted object, wherein the extracted object includes at least one of text, graphic, image and metadata information, and wherein the degradation level is determined according to a combination of an attribute of the object and the security level correlated to the object.

2. The information processing apparatus according to claim 1, further comprising a restoration unit configured to restore, in a case that the extracted object is being output, the extracted object to a determined restoration level correlated to a user's authorized security level.

3. An information processing method for controlling an information processing apparatus that creates a security-protected document to be output based on a determined security level assigned to an object included in an input document without utilizing encryption/decryption or requiring a user to perform an operation, the method comprising:

extracting, via a generation unit, the object from the input document and storing the extracted object in a storage area;

updating/correcting existing metadata information already affiliated with the extracted object;

generating new metadata information pertaining to the extracted object, identifying an attribute correlated with characteristic information pertaining to the extracted object, wherein the characteristic information derived from an analysis result is added to the existing metadata information associated with the extracted object;

determining, via a determination unit, a degradation level for the extracted object in accordance with an analysis result of the extracted object by the analysis unit;

degrading, via a degradation unit, in a case of performing output processing using the extracted object stored in the storage area, the extracted object according to the degradation level determined by the determination unit, and if it is determined that information matching the attribute indicating a characteristic of the object exists, performing degradation processing on the object according to the level of the attribute indicating a characteristic of the matched object;

storing, via a storage unit, a table that previously stores an attribute indicating a characteristic of the object which had been extracted from the document and a security level associated with each other, wherein the degradation level is determined by correlating an identified attribute of the extracted object, identified in the analysis result, with a determined security level assigned to the identified attribute of the extracted object, wherein the extracted object includes at least one of text, graphic, image and metadata information, and wherein the degradation level is determined according to a combination of an attribute of the object and the security level correlated to the object.

4. The information processing method according to claim 3, further comprising, restoring, via a restoration unit, in a case that the extracted object is being output, the extracted object to a determined restoration level correlated to a user's authorized security level.

5. A non-transitory computer readable medium containing computer-executable instructions which, when executed by a computer, causes the computer to perform operations in an information processing apparatus that creates a security-protected documents to be output based on a determined security level assigned to an object included in an input document without utilizing encryption/decryption or requiring a user to perform an operation, the medium comprising:

computer-executable instructions for extracting the object from an input document and storing the extracted object in a storage area;

computer-executable instructions for updating/correcting existing metadata information already affiliated with the extracted object;

computer-executable instructions for generating new metadata information pertaining to the extracted object;

computer-executable instructions for identifying an attribute correlated with characteristic information pertaining to the extracted object, wherein the characteristic information derived from an analysis result is added to the existing metadata information associated with the extracted object;

computer-executable instructions for determining a degradation level for the object in accordance with an analysis result of the extracted object;

computer-executable instructions for degrading, in a case of performing output processing by using the extracted object stored in the storage area, the extracted object according to the determined degradation level, and if it is determined that information matching the attribute indicating a characteristic of the object exists, performing degradation processing on the object according to the level of the attribute indicating a characteristic of the matched object;

computer-executable instructions for storing a table that previously stores an attribute indicating a characteristic of the object which had been extracted from the document and a security level associated with each other, wherein the degradation level is determined by correlating an identified attribute of the extracted object, identified in the analysis result, with a determined security level assigned to the identified attribute of the extracted object, wherein the extracted object includes at least one of text, graphic, image and metadata information, and wherein the degradation level is determined according to a combination of an attribute of the object and the security level correlated to the object.

6. The medium according to claim 5, further comprising computer-executable instructions for restoring, in a case that the extracted object is being output, the extracted object to a determined restoration level correlated to a user's authorized security level.

* * * * *